United States Patent [19]

Moers et al.

[11] 4,236,563
[45] Dec. 2, 1980

[54] PNEUMATIC TIRE WITH ANISOTROPIC FILLER STRIP

[75] Inventors: Daniel Moers, Montpellier; Michel Balland, Rosny-sous-Bois, both of France

[73] Assignee: Pneumatiques, Caoutchouc Manufacture et Plastiques Kleber-Colombes, Colombes, France

[21] Appl. No.: 923,211

[22] Filed: Jul. 10, 1978

[30] Foreign Application Priority Data

Jul. 11, 1977 [FR] France .................. 77 21399

[51] Int. Cl.³ .................. B60C 15/06; B60C 9/08
[52] U.S. Cl. .................. 152/354 R; 152/357 R; 152/362 R; 152/374
[58] Field of Search ........... 152/362 R, 357 A, 357 R, 152/362 CS, 354 R, 354 RB, 355, 356 R, 356 A, 374; 156/110 CL

[56] References Cited

U.S. PATENT DOCUMENTS

| | | |
|---|---|---|
| 3,697,364 | 10/1972 | Boustany et al. ............ 152/357 R |
| 3,841,378 | 10/1974 | Hamacher et al. ........... 152/362 R |
| 3,945,420 | 3/1976 | Görter et al. ............... 152/357 A |
| 4,067,373 | 1/1978 | Delobelle et al. ........ 152/362 R X |
| 4,120,338 | 10/1978 | Mirtain ....................... 152/362 R |

Primary Examiner—John T. Goolkasian
Assistant Examiner—Lois E. Rodgers
Attorney, Agent, or Firm—Brisebois & Kruger

[57] ABSTRACT

A vehicle tire has a radial carcass and a reinforced crown and the tire beads each comprise at least one beadwire surmounted by a filler strip whose cross-section is broadly tapered towards the side-wall and which is made of a rubbery mixture reinforced with short fibres. According to the invention, the fibres reinforcing the filler strip are, at least in part, orientated in the radial direction of the tire so that the mixture used for the strip has a ratio of anisotropy at least equal to 2:1. The filler strip may rise up the side wall to a height of between 0.2 and 0.5 times the cross-sectional height of the tire.

3 Claims, 2 Drawing Figures

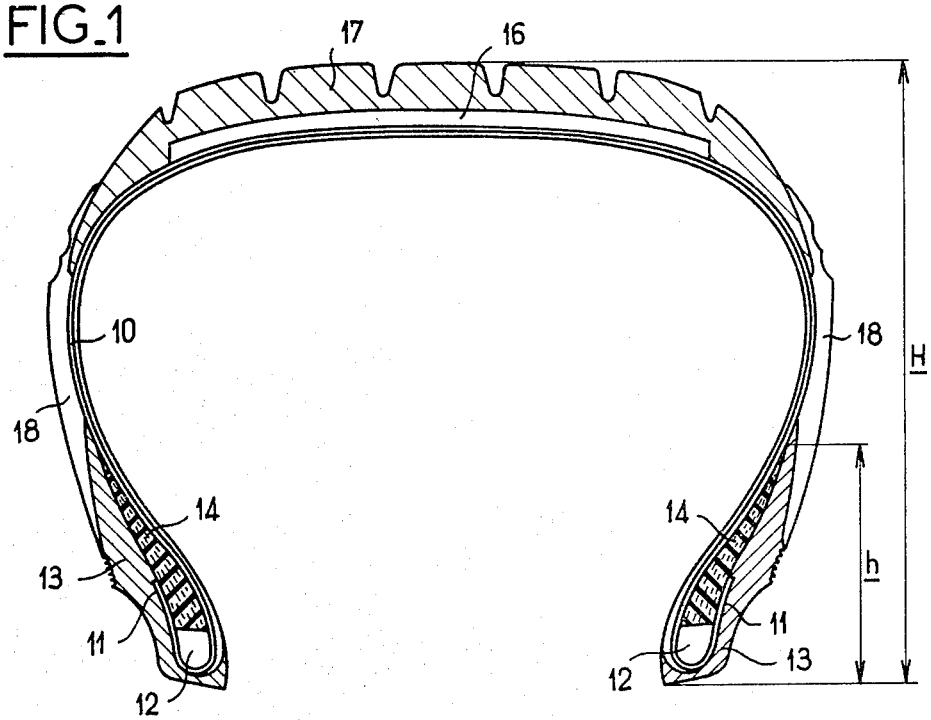
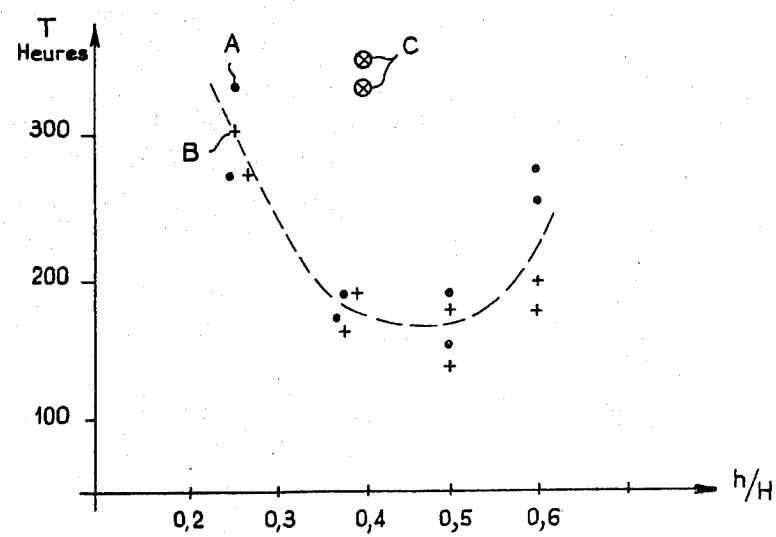

PNEUMATIC TIRE WITH ANISOTROPIC FILLER STRIP

BACKGROUND OF THE INVENTION

The present invention relates to pneumatic tires and in particular to tires having a radial carcass and a reinforced crown.

The invention has as an object to improve the construction of such tires with a view to endowing them with better endurance and improved behaviour on the road.

In the conventional present day construction, the beads of tires each contain at least one inextensible beadwire surmounted by a filler strip of hard rubber generally of triangular cross section, the carcass ply or plies being folded around this combination of wire and strip.

The main function of the filler strip is to bring about a gradual transition in stiffness between the very stiff bottom part of the bead and the thin and flexible part of the side-wall. This transition may be adjusted to give a desired increase in such and such a property of the tire, such for example as the standard of ride it gives or its properties of road holding and road behaviour. This may be done by making the filler strip of greater or lesser hardness and height. However, the opportunities in this direction are limited by manufacturing requirements and the danger of detracting from other properties of the tire. Thus, hard rubber filler strips of considerable height (extending for example half way up the side-wall) are favourable to good road behaviour (ability to hold a straight line and rapid response to changes of direction) but their endurance is poor under repeated vertical flexure of the side-walls, with the result that tire failures occur as a result of breaks in the filler strips and in the carcass plies just above the edges of the rim. Filler strips of small height produce tires in which the endurance of the beads is better but whose behaviour on the road is worse. This fault can be remedied by inserting additional reinforcing members such as flippers (strips of fabric folded around the bead-wire and filler combination), reinforcing strips applied to the folded edges of the carcass, or transition rubbers which form an extension of the filler strip in the direction of the side-wall. However, these palliatives increase the number of items which have to be assembled, the cost of manufacture and the risks of bad workmanship.

As to the nature of the filler strips, it has already been proposed, as a variation on conventional mixtures containing large proportions of reinforcing filler materials, to use mixtures of rubber and intermingled fibres masticated with the rubber. A fibrous mixture of this kind makes it possible to obtain the high levels of hardness which are generally required for filler strips but they in no way overcome the drawbacks mentioned. If the filler strip is of considerable height it breaks and if it is short it does not give good road behaviour without recourse to additional reinforcing members.

SUMMARY OF THE INVENTION

It has now been found that it is possible to achieve a far better compromise between the main qualities required from tires when the beads contain filler strips made of a special mixture of rubber and suitably orientated fibres and when the filler strips are of the appropriate height. Thus, the fibres reinforcing the strips are, at least in part, orientated in the radial direction of the tire so that the mixture used for the strip has a ratio of anisotropy at least equal to 2:1 . Advantageously the filler strip rises up the side wall to a height of between 0.2 and 0.5 times the cross-sectional height of the tire.

BRIEF DESCRIPTION OF THE DRAWINGS

The invention will now be further described, by way of example, with reference to the accompanying drawings, in which:

FIG. 1 is a cross-section of one embodiment of a tire according to the invention; and FIG. 2 is a graph illustrating the results of endurance tests on tires according to the invention.

DESCRIPTION OF THE PREFERRED EMBODIMENT

The tire which is shown by way of example in FIG. 1 is an automobile tire. It has a radial carcass 10 which is formed by one or more superimposed plies of weftless or sparsely wefted rubberised fabric made of flexible textile or metal cords which are orientated in meridional planes of the tire. The edges 11 of this carcass are each folded outwards around the combination formed by the bead-wire 12 and the filler strip 14 which surmounts the bead-wire. The folded edges 11 are covered by rim rubbers 13 of a rubbery mixture which resists abrasion from contact with the edges of the rim. The crown of the carcass 10 is confined by a circumferentially inextensible reinforcing belt 16 which is formed, for example, by one or more plies of rubberised fabric made from textile or metal cords. This belt is covered by the tread 17 which contains a pattern suitable for the usage of the tire. The sidewalls of the carcass are covered by side-wall bands 18 of a flexible rubbery mixture.

In the construction of the beads of the tire as illustrated, the filler strip 14 has a cross-section of broadly triangular shape which tapers in the upwards direction and is of a height such that the apex of the filler strip is situated at a distance h from the base of the bead of between 0.2 and 0.5 times the cross-sectional height H of the tire. The filler strip 14 is made of a rubbery mixture reinforced with short fibres, the mixture being worked in such a way that at least a major proportion of the fibres are orientated mainly in the radial or meridional direction of the tire. In the finished tire, the extension-resisting properties which this mixture has show marked anisotropy, the resistance concerned being at least twice as high in the radial direction as when measured in the other, orthogonal directions (a ratio of anisotropy of 2:1 or more).

To produce the fibrous mixtures it is possible to use various proportions for fibre and fibres of various kinds as regards their nature, length and fineness, depending upon the techniques adopted for mixing them with the rubber matrix and for endowing them with a more or less pronounced degree of orientation. What is important is that mixtures having the required anisotropy characteristics should be obtained. Good results have been achieved with fibrous mixtures containing from 10 to 75 parts by weight of fibre to one hundred parts of rubber, the incorporated fibres being "Santoweb" cellulose fibres made by Messrs Monsanto Co. having lengths of between 0.5 and 3 mm and a diameter of the order of 0.01 mm. Mixtures having such fibre contents and worked to orientate at least a proportion of the fibres in the radial direction of the tire allow ratios of anisotropy appreciably better than 2:1 and possibly as high as 10:1 to be obtained after vulcanisation. When tested, certain mixtures showed a resistance to extension of 100 kg/cm² at 10% extension in the radial direction and a resistance to extension of 14 kg/cm² at 10% extension in the circumferential or longitudinal direction of the tire.

The superiority of the results obtained by using filler strips 14 made of an anisotropic fibrous mixture has been demonstrated by comparative tests on the behaviour and endurance of automobile tires containing filler strips made from various mixtures whose compositions are given below (Conventional orthotropic mixtures A reinforced with powdered filler materials; fibrous mixtures B containing fibres orientated to a greater or lesser degree in the circumferential direction of the tire; and fibrous mixtures C containing fibres orientated in the radial direction of the tire) and, for reach type of mixture, filler strips of various heights corresponding to h/H ratios of 0.25, 0.40 0.50 and 0.60.

|  | Mixture A | Mixtures B & C |
| --- | --- | --- |
| Natural rubber | 100 | 50 |
| Styrene/butadiene rubber | — | 50 |
| Reinforcing black | 72 | 40 |
| Sulphur | 5 | 2 |
| Accelerator | 1.5 | 1 |
| Antioxidant | 2 | 2 |
| Zinc oxide | 5 | 3 |
| Stearic acid | 2 | 2 |
| Processing oil | 3 | — |
| "Santoweb" fibres | — | 50 |

The test used to evaluate the endurance of the beads consisted in rotating the tires in contact with a rotary fly-wheel at a speed of 80 km/hour under a load and at pressure equal to 165% of the normal load and pressure and measuring the time required for failure to occur in the bead zone.

The results of the tests are shown graphically in FIG. 2, which is an endurance graph showing the time T after which the tires tested experienced a failure which made them unusable, these times being plotted against the h/H ratios. It can be seen that tires containing fillers strips 14 made from the mixtures A and B (not according to the invention) have good bead endurance only when the height of the filler strips is less than 0.3H, moderate endurance when their height is greater than 0.5H, and distinctly worse endurance when the height range is between 0.3 and 0.5H. However, as indicated above, when the h/H ratio is less than 0.3, lateral instability is found in road tests which gives the impression that the vehicle has soft steering which is imprecise on bends and which snakes when returning to a straight line on leaving bends. Tires having filler strips of a height greater than 0.5H have very short response times which give the impression that the vehicle has harsh steering which acts suddenly when entering and leaving bends. In both cases the behaviour of the tires tested is unpleasant for average drives and may even be dangerous for inexperienced drivers.

On the other hand, the automobile tires tested which had filler strips 14 made of an anisotropic fibrous mixture C according to the invention showed excellent fatigue resistance in the height range of between 0.3 and 0.5H in which the road behaviour of the tires is at its best and provides the most pleasant drive for the majority of drivers. It is thus demonstrated that such filler strips of anisotropic fibrous mixture which have their greatest resistance to extension in the radial direction of the tire enable the best compromise to be reached between endurance and good behaviour on the road.

The tires tested had the bead construction illustrated in FIG. 1. It should be mentioned in this connection that with this bead construction it is possible to dispense with the use of the other additional reinforcements which are often used, such as fabric flippers enclosing the bead-wire and filler strip combination, and fabric stiffening strips applied against the folded edges 11 of the carcass. The construction is thus simple and economical.

Provision may be made for the folded edges 11 of the carcass to rise to a greater or lesser height in the direction of the side-wall so as completely or partly to cover the outer face of the filler strip 14, so that the behaviour characteristics can be adjusted as desired. However, this adjustment may also be made by altering the properties of the strips 14 by varying the fibre content or the characteristics of the fibres or the hardness of the mixture by conventional means. It is possible in this way to reduce to a minimum the length of the folded edges 11 of the carcass so that they do not rise substantially above the level of the top of the bead-wires, which makes it possible to economise on relatively expensive material.

The application of the invention is not restricted to the radial automobile tires described above. It may also be applied to types of tire other than automobile tires, namely tires for trucks and vans, agricultural vehicles, civil engineering vehicles or aircraft.

We claim:

1. A pneumatic tire having:
   (a) a radial carcass provided with a reinforced crown,
   (b) a pair of beads each including at least one bead-wire, and
   (c) a filler strip located between each said bead-wire and said crown, and wherein each said filler strip has a cross-section which tapers in a direction towards said crown and which is made from a rubbery mixture reinforced with short fibres, said mixture consisting of 10 to 75 parts by weight of said fibres to 100 parts by weight of said rubber and wherein each said filler strip extends in a direction of the side wall associated therewith to a height of between 0.2 and 0.5 times the cross-sectional height of the tire, the fibres reinforcing the mixture of the strip being, at least in part, orientated in the radial direction of the tire whereby the mixture of the strip has a ratio of anisotropy at least equal to 2:1.

2. A tire according to claim 1, in which the short fibres reinforcing the strip have a length between 0.5 to 3 mm and a diameter of the order of 0.01 mm.

3. A tire according to claim 1, in which the edges of the carcass are folded outwardly around each said bead-wire, and the said folded edges do not extend substanially beyond the level of the top of the bead-wire around which they are folded.

* * * * *